US012791574B2

(12) United States Patent
McDevitt et al.

(10) Patent No.: US 12,791,574 B2
(45) Date of Patent: Nov. 10, 2026

(54) MICROFLUIDIC FLOW CONTROL

(71) Applicant: NEW YORK UNIVERSITY, New York, NY (US)

(72) Inventors: John T. McDevitt, New York, NY (US); Michael P. McRae, Houston, TX (US)

(73) Assignee: New York University, New York, NY (US)

( * ) Notice: Subject to any disclaimer, the term of this patent is extended or adjusted under 35 U.S.C. 154(b) by 405 days.

(21) Appl. No.: 18/318,957

(22) Filed: May 17, 2023

(65) Prior Publication Data

US 2023/0375587 A1 Nov. 23, 2023

Related U.S. Application Data

(60) Provisional application No. 63/342,852, filed on May 17, 2022.

(51) Int. Cl.
*G01N 35/10* (2006.01)

(52) U.S. Cl.
CPC ..... *G01N 35/1016* (2013.01); *G01N 35/1095* (2013.01)

(58) Field of Classification Search
CPC ........... G01N 35/1016; G01N 35/1095; G05D 7/0694; B01L 2200/143; B01L 2200/16; B01L 2300/0654; B01L 2400/0481; B01L 2400/0487; B01L 3/50273; G01F 1/7086
USPC ...... 348/61, 142; 356/27, 28, 436–438, 441, 356/442, 243.1; 340/606–635; 73/1.01–1.7, 1.16–1.36, 1.57, 1.59–1.62, 73/1.73, 1.74, 61.48, 293, 705, 863.02; 702/45
See application file for complete search history.

(56) References Cited

U.S. PATENT DOCUMENTS 10,060,937 B2 8/2018 Mcdevitt

FOREIGN PATENT DOCUMENTS

| | | | | |
|---|---|---|---|---|
| CN | 108548783 B | * | 11/2019 | .......... B01L 3/50273 |
| WO | WO-2009125676 A1 | * | 10/2009 | ........ B01L 3/502784 |
| WO | WO-2020072843 A1 | * | 4/2020 | .............. B01L 3/502 |

OTHER PUBLICATIONS

McRae, M. P. (2016). Integrated instrumentation and multivariate index assay system for cardiovascular health assessment at the point of care (Doctoral dissertation, Rice University). DOI: https://hdl.handle.net/1911/96539. 138 pages.
McRae, M. P., Simmons, G. W., Wong, J., Shadfan, B., Gopalkrishnan, S., Christodoulides, N., & McDevitt, J. T. (2015). Programmable bio-nano-chip system: a flexible point-of-care platform for bioscience and clinical measurements. Lab on a Chip, 15(20), 4020-4031. https://doi.org/10.1039/C5LC00636H.

* cited by examiner

*Primary Examiner* — Robert R Raevis
(74) *Attorney, Agent, or Firm* — Riverside Law LLP

(57) ABSTRACT

The present invention provides devices and methods that precisely control the flow of fluids. In various embodiments, the present invention relates to devices and methods configured to optically track fluid flow into and through an optically monitored region or regions and to adjust fluid flow based on parameters detected within the optically monitored region or regions. In various embodiments, the devices and methods of the present invention pertain to the control of fluids in microfluidic chip systems.

15 Claims, 14 Drawing Sheets

| | |
|---|---|
| Run 1 | Pass |
| Run 2 | Pass |
| Run 3 | Fail – leak |
| Run 4 | Fail – leak L blister |
| Run 5 | Pass |

MICROFLUIDIC FLOW CONTROL

CROSS-REFERENCE TO RELATED APPLICATIONS

This application claims priority to U.S. Provisional Application No. 63/342,852, filed on May 17, 2022, incorporated herein by reference in its entirety.

BACKGROUND OF THE INVENTION

One of the most important considerations when designing a lab on a chip (LOC)/microfluidic device is the method of fluid delivery which transports specimens, reagents, and wash buffers to a sensor. Fluid flows can be manipulated in microfluidic devices through a variety of driving forces (e.g., pressure, electric, magnetic, capillary, centrifugal, and acoustic) for many purposes (to mix, react, detect, analyze, separate, etc.). Defining the flow rate conditions is an important assay optimization step, and various factors are considered including volume limitations, time constraints, and performance.

Traditionally, microfluidics research has relied on cumbersome equipment like syringe pumps and microscopes which are not amenable to point-of-care (POC) settings. Without a compact and fully-integrated fluid delivery system, these research stations render tiny lab-on-a-chip (LOC) devices into "chips in a lab" that are unusable outside of an academic environment. Among the many possible fluid delivery mechanisms available to LOC developers, the external compression of on-chip fluid-filled pouches or blister packs is attractive for POC applications because all of the necessary reagents can be stored conveniently on the device. In this configuration, fluid flow may be controlled by an instrument or analyzer providing blister actuation. Despite numerous examples of commercial microfluidic devices with blister packs, limited information is available about the accuracy and reproducibility of customizable and controlled flows resulting from blister actuation in the context of microfluidic-based bioassay systems.

Therefore, there is a need in the art for fluid systems that can administer accurate and repeatable flow rates. The present invention meets this need.

SUMMARY OF THE INVENTION

In one aspect, the present invention relates to a method of microfluidic flow control, comprising the steps of: capturing and processing an optical signal of a sample region to obtain a baseline measurement of the sample region; activating an actuator such that a fluid in a fluid reservoir is directed out of the reservoir into the sample region; continuously capturing and processing a series of optical signals of the sample region while the actuator is activated to obtain a series of measurements of the sample region; and deactivating the actuator upon obtaining a measurement of the sample region that reaches a threshold measurement.

In one embodiment, the step of deactivating the actuator is performed automatically in a closed loop. In one embodiment, the optical signal is selected from the group consisting of: a photographic image, optical light, ultraviolet light, infrared light, bioluminescent light, fluorescent light, indirect light, filtered light, and polarized light. In one embodiment, the actuator is activated at a rate measured by distance traveled by a force applicator over time. In one embodiment, the actuator is activated at a rate measured by displacement of fluid volume over time. In one embodiment, deactivation of the actuator can be followed by a brief reverse activation of the actuator such that residual flow of the fluid is prevented. In one embodiment, failure to reach the threshold measurement indicates a malfunction.

In one aspect, the present invention relates to a system for microfluidic flow control, comprising: one or more light sources; one or more optical sensors; one or more actuators; and a controller comprising a processor and a non-transitory computer-readable medium with instructions stored thereon; wherein the instructions, when executed by the processor, performs steps comprising: capturing and processing an optical signal of a sample region to obtain a baseline measurement of the sample region; activating the one or more actuators such that a fluid in a fluid reservoir is directed out of the reservoir into the sample region; continuously capturing and processing a series of optical signals of the sample region while the one or more actuators is activated to obtain a series of measurements of the sample region; and deactivating the one or more actuators upon obtaining a measurement of the sample region that reaches a threshold measurement.

In one embodiment, the system further comprises one or more microfluidic chips, each microfluidic chip comprising at least one sample region and at least one fluid reservoir fluidly connected to the at least one sample region. In one embodiment, the one or more actuators are selected from the group consisting of: solenoid pumps, piezoelectric pumps, peristaltic pumps, vacuum pumps, syringe pumps, rollers, pressers, stepper motors, and compressors. In one embodiment, the one or more light sources are selected from the group consisting of: ultraviolet (UV) light emitting diodes (LEDs), infrared LEDs, white LEDs, color LEDs, tungsten lamps, halogen lamps, arc lamps, and laser diodes. In one embodiment, the one or more optical sensors are selected from the group consisting of: photodiodes, photodiode arrays, camera sensors, and camera sensor arrays.

BRIEF DESCRIPTION OF THE DRAWINGS

The following detailed description of exemplary embodiments of the invention will be better understood when read in conjunction with the appended drawings. It should be understood, however, that the invention is not limited to the precise arrangements and instrumentalities of the embodiments shown in the drawings.

DETAILED DESCRIPTION

Figure 1:
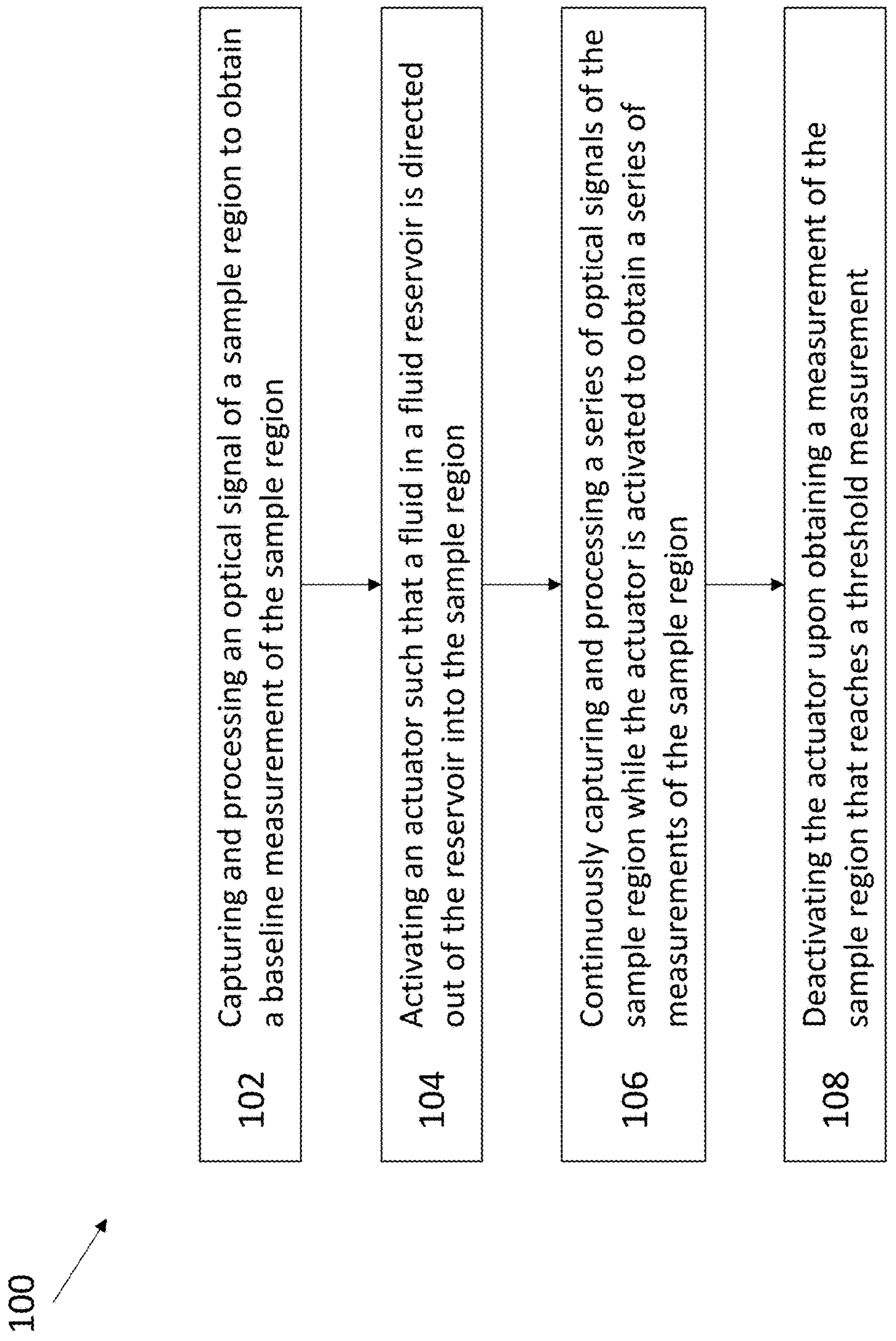
FIG. 1 depicts a flowchart of an exemplary fluid control method of the present invention.

The present invention provides devices and methods that precisely control the flow of fluids. In various embodiments, the present invention relates to devices and methods configured to optically track fluid flow into and through an optically monitored region or regions and to adjust fluid flow based on parameters detected within the optically monitored region or regions. In various embodiments, the devices and methods of the present invention pertain to the control of fluids in microfluidic chip systems.

Definitions

It is to be understood that the figures and descriptions of the present invention have been simplified to illustrate elements that are relevant for a clear understanding of the present invention, while eliminating, for the purpose of clarity, many other elements typically found in the art. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined elsewhere, all technical and scientific terms used herein have the same meaning as commonly understood by one of ordinary skill in the art to which this invention belongs. Although any methods and materials similar or equivalent to those described herein can be used in the practice or testing of the present invention, exemplary methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 2, 2.7, 3, 4, 5, 5.3, 6, and any whole and partial increments there between. This applies regardless of the breadth of the range.

Microfluidic Flow Control

This invention described herein provides methods for delivering biofluids and reagents within a microfluidic device to a biosensor using a closed loop optical feedback system. In certain instances, the method works by compressing the blister actuators to deliver fluid flow to the sensor. Using the instrument's internal optics (the camera, filters, LED illumination) to visualize the fluid (water, PBS, etc.) or biospecimen (blood, serum, saliva, cytological sample, etc.) and/or detecting reagents (fluorescently labelled antibodies, quantum dots, etc.), novel algorithms detect when the fluid flows into the field of view and reaches the biosensors. Once fluid is detected, the assay sequence is initiated by compressing the blister actuators at the specified flow rate. By detecting the fluid flow front in this manner, highly accurate fluid volumes and flow rates are made possible, thus, leading to improvements in assay precision.

One major challenge for integrating blister packs into the LOC device is the method by which fluids are introduced into the microfluidic cartridge. By design, blister packs are completely sealed to preserve the integrity of their sterile aqueous buffers. Thus, releasing the reagents from a blister pack often requires catastrophic failure of the fully encapsulated blister. For example, in certain bio-nano-chip devices, a puncturing mechanism on the cartridge pierces a foil membrane on the blister upon depression with the actuator tip. Once the blister bursts, the reagents are routed into the cartridge through a drain. Recognition of this burst event is crucial to administering accurate volumes and flow rates.

Previously, to detect the burst event, a force sensitive feedback method was implemented using a force sensor mounted between the actuator and actuator tip. An algorithm detected when the force suddenly decreases, indicating that the blister has burst and is depressurizing. Once the burst is detected, the software initiates the flow protocol and continues the assay sequence. The problem with this approach is that the blister burst event (i.e., attempting to detect catastrophic failure of the bottom foil) is complex and highly variable, and attempting to control these system-level parameters may be costly and impractical. The list below summarizes some of the problems encountered with this approach. 1. Failure to detect the blister burst is a frequently encountered failure mode for the bio-nano-chip system; 2. Uncontrolled release of fluid flow after the blister bursts often led to inaccurate fluid volumes and flow rates, both of which negatively affect assay precision 3. Batch to batch variability of blisters and cartridges required frequent blister burst algorithm tuning and calibration 4. Required tight mechanical tolerances on the blister rupture spikes to induce the failure of the foil in a repeatable fashion.

This invention disclosed herein solves several of these problems with blister bursting. First, this vision feedback system eliminates the need to detect the blister burst (1). Uncontrolled release of fluid flow (2) is no longer an issue since accurate fluid volumes are instead indexed by when the vision system detects the flow front. The effect of batch-to-batch variability of blisters and cartridges requiring frequent tuning and calibration (3) is no longer necessary, since accurate fluid volumes are no longer dependent on the highly variable burst process. Finally, tolerances on the blister rupture spikes (4) are relaxed since uncontrolled fluid release no longer constitutes loss of experimental control or assay failure.

This process involving a closed loop vision feedback system may also be used to detect cartridge leaks. In this scenario, leaks may be detectable if the fluid is not detected within the expected number of steps. In longer assays, like oral cancer, this feature could have significant impact on usability in point of care settings. For example, if a leak is detected by the vision feedback system early in the assay, the run could be rejected and retested, saving up to 30 minutes. Without this feature, a leak would only be detected after the assay is completed and the cartridge is ejected and inspected by the technician.

Referring now to FIG. 1, a flowchart depicting an exemplary method 100 for microfluidic flow control is shown. Method 100 begins with step 102, wherein an optical signal of a sample region is captured and processed to obtain a baseline measurement of the sample region. In step 104, an actuator is activated such that a fluid in a fluid reservoir is directed out of the reservoir into the sample region. In step 106, a series of optical signal of the sample region are continuously captured and processed while the actuator is activated to obtain a series of measurements of the sample region. In step 108, the actuator is deactivated upon obtaining a measurement of the sample region that reaches a threshold measurement. In some embodiments, step 108 is performed automatically, such as in a closed loop. In some embodiments, step 108 is performed manually, such as in an open loop.

A sample region is generally understood as a region where the mixture of one or more fluid solutions or the mixture of one or more fluid solutions with a functionalized surface produces a visual change or reaction. The one or more fluid solutions can include but are not limited to reagents, buffers, washes, cell suspensions, plasma, serum, dyes, and the like. In some embodiments, the fluid solutions can be positioned downstream from a reagent source, such that a fluid passes through the reagent source and picks up or mixes with a reagent prior to entering the sample region. The reagent source can be in the form of a solid state, a concentrated liquid state, or a portion of a solution that reacts with a fluid and is temporarily stored separately to delay the reaction.

Visual changes or reactions in the sample region can be captured as optical signals, including but not limited to photographic images, optical light, ultraviolet light, infrared light, bioluminescent light, fluorescent light, indirect light (such as in dark-field microscopy), filtered light, polarized light, and the like. In certain embodiments, an optical signal is received as light reflected from a light source. Optical signals can be captured by an optical sensor, stored on non-transitory computer-readable media, and processed by a processor using software instructions to obtain a measurement. In some embodiments, optical signals can be captured across an entire sample region. In some embodiments, optical signals can be captured from a sub-region of a sample region, such as a region adjacent to fluid entryways into the sample region.

Contemplated measurements include but are not limited to: luminance, radiance, refraction index, color analysis, fluorescence, phosphorescence, absorbance, and the like. A baseline measurement is obtained during a state of the sample region where no visual change or reaction has yet occurred, such that subsequent visual changes or reactions may be measured relative to the baseline. In some embodiments, a threshold value is set relative to the baseline. The threshold value is a measurement of optical signals in the sample region that indicates the sufficiency of the addition of one or more fluids into the sample region. The threshold value can be a numerical threshold (such as a measurement that is n units above a baseline measurement, wherein the units are determined with respect to the relevant measurement, such as nits, watt per steradian per square meter, RGB value, and the like), a proportional threshold (such as a change measured in a percent difference), or a calculated statistical threshold (such as n standard deviations or a correlation coefficient between two or more measurements). In some embodiments, the threshold value can be a predetermined value obtained from a controlled assay correlating an optical measurement with a desired fluid volume in a sample region or with a desired level of visual change or reaction in a sample region.

In some embodiments, the optical measurement measures changes in refraction index and median image intensity as a sample region is wetted by a fluid, and the measurement is quantified as a Pearson correlation comparing standard deviation across pixel locations in digital image captures of the sample region. Contemplated methods to detect fluids based on computer vision, statistical, and machine learning methods include but are not limited to: mean squares, cross-correlation, standard deviation, image difference (pattern intensity), L2 norm (Euclidean distance), Mahalanobis distance, mutual information, contrast, sharpness, structural similarity index, Laplacian focus measure, fuzzy entropy, Brenner gradient, Roberts function, Sobel gradient, Vollath function, mid-frequency discrete cosine transform, improved power spectral in frequency-domain function, Tenengrad method, scale-invariant feature transform (SIFT) and speeded up robust features (SURF) methods, histogram of oriented gradients (HoG), convolutional neural networks, and principal components analysis (PCA).

In some embodiments, the optical measurement measures changes in fluorescence as a sample region receives a fluid fluorescent dye, and the measurement is quantified as median fluorescence intensity across pixel locations in digital image captures of the sample region.

As described above, a sample region may undergo a visual change or reaction after receiving one or more fluids. The one or more fluids may each be stored in a fluid reservoir and introduced into the sample region by an actuator. Activation of an actuator may be performed at a steady rate or in incremental steps. The rate of activation may depend on the type of actuator. For example, actuators that press or squeeze a fluid reservoir may have an activation rate that is measured in terms of distance traveled by a force applicator of an actuator (such as in μm, mm, cm, and the like) over time, while actuators that push or pull fluid using a pump or vacuum may have an activation rate that is measured in terms of displacement of fluid volume (such as in μL, mL, and the like) over time. Continuous capture and processing of a series of optical signals of the sample region during activation of an actuator can be performed at any desired frequency. In some embodiments, the rate of capturing and processing optical signals can be described in terms of frames per second, wherein each frame is a digital image capture of the sample region. In some embodiments, capturing and processing optical signals can be performed at a rate that is synced with a stepped activation rate of an actuator.

As described elsewhere herein, a threshold value is set relative to a baseline measurement, wherein reaching the threshold value indicates the sufficiency of the addition of one or more fluids into the sample region. Accordingly, upon obtaining a measurement of the sample region that reaches the threshold measurement, activation of actuators is ceased. In some embodiments, deactivation of an actuator may be followed by a brief reverse activation of the actuator by one or more steps, such that residual flow of fluid into a sample region is prevented. In some embodiments, a threshold value is not reached during step 106. For example, the series of measurements of the sample region do not indicate any changes from a baseline measurement, or there is a sudden drop off or flatlining of the series of measurements. In some embodiments, no changes from baseline measurement or a sudden drop off or flatlining of a series of measurements may indicate that a malfunction has occurred. The malfunctions can include but are not limited to: actuator activation failure, fluid reservoir leak, microfluidic channel leak, microfluidic channel blockage, light source failure, inaccurate fluid transfer, light source application, and the like.

Microfluidic Flow Control System

Figure 2:
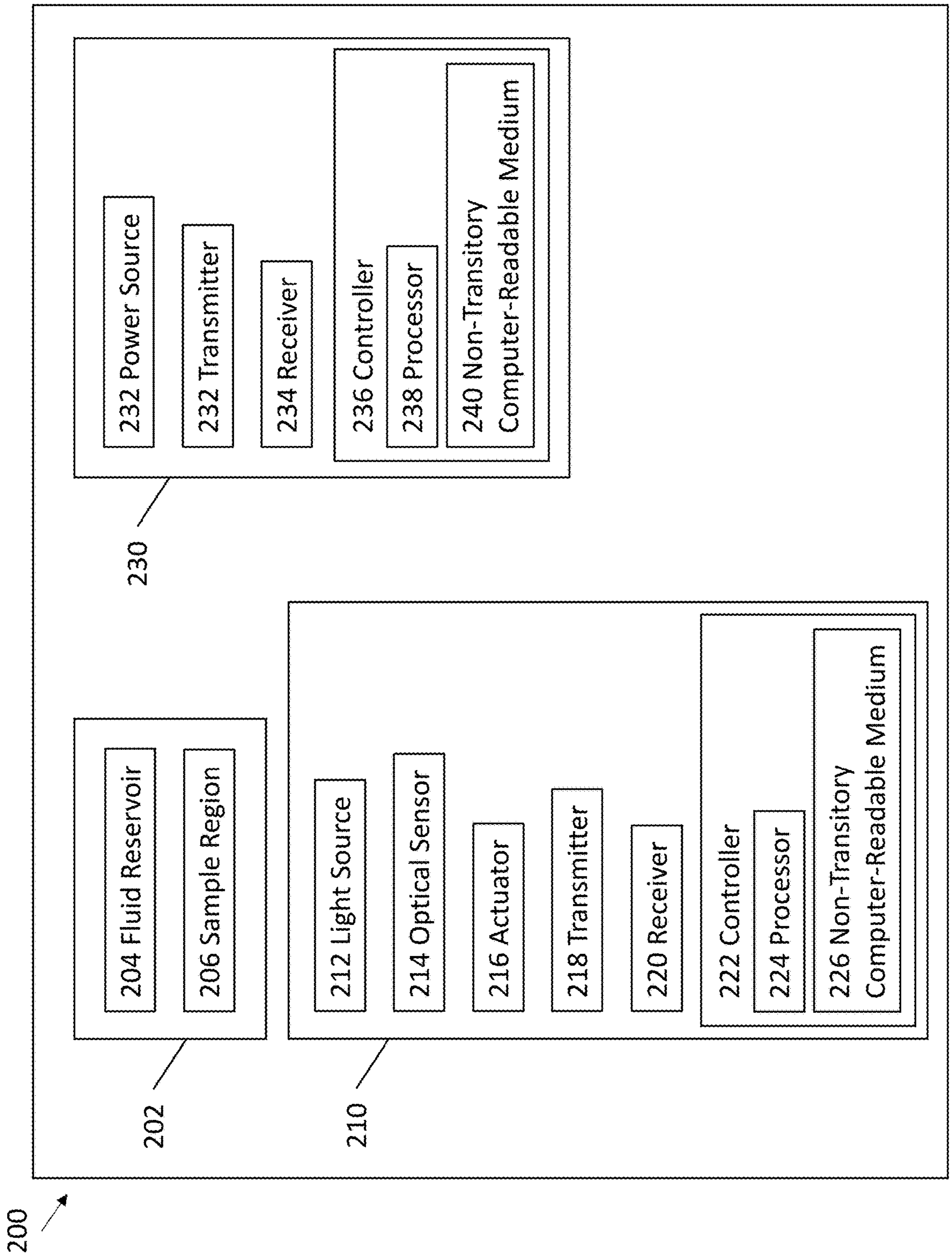
FIG. 2 depicts a diagram of an exemplary fluid control system of the present invention.

Referring now to FIG. 2, an exemplary microfluidic flow control system 200 is depicted. System 200 provides components configured to carry out the steps of method 100. In some embodiments, system 200 comprises: microfluidic chip 202 having at least one fluid reservoir 204 and at least one sample region 206; and microfluidic chip reader 210 having at least one light source 212, at least one optical sensor 214, at least one actuator 216, at least one transmitter 218, at least one receiver 220, and at least one controller 222 comprising a processor 224 and non-transitory computer-readable medium 226. In some embodiments, system 200 further comprises computer platform 230 having at least one transmitter 232, at least one receiver 234, and at least one controller 236 comprising a processor 238 and non-transitory computer-readable medium 240.

Microfluidic chip 202 comprises a housing wherein each of the fluid reservoirs 204 and sample regions 206 are embedded within. As would be understood by those having skill in the art, fluid reservoirs 204 and sample regions 206 are fluidly connected by one or more microchannels, such that a fluid residing within each of the fluid reservoirs 204 are channeled to one or more sample regions 206 of interest. Each of the fluid reservoirs 204 and sample regions 206 can comprise one or more ports for loading or extracting a fluid, and each of the fluid reservoirs 204 and sample regions 206 can comprise an actuatable component, where actuation of the actuatable component imparts a pressure change in the microfluidic environment to influence fluid flow between the fluid reservoirs 204 and sample regions 206. Contemplated actuatable components include but are not limited to blister membranes, syringes, pumps, and the like.

Microfluidic chip reader 210 comprises a housing and a receiving bay configured to receive one or more microfluidic chips 202 While not pictured, receiving bays of chip readers are understood by those having skill in the art to take various forms, including but not limited to cassette/card/chip slots, retractable drives, platforms/stages that can be stationary or translatable in x, y, and/or z planes, and the like. The receiving bay is also configured to position the one or more microfluidic chips 202 within chip reader 210 such that regions of interest on the one or more microfluidic chips 202 are aligned with relevant components of chip reader 210. For example, in some embodiments the one or more fluid reservoirs 204 can be aligned with the one or more actuators 216, such that an actuatable component of each of the fluid reservoirs 204 are actuatable by a respective actuator 216. Contemplated actuators 216 include but are not limited to: solenoid pumps, piezoelectric pumps, peristaltic pumps, vacuum pumps, syringe pumps, rollers, pressers, stepper motors, compressors, and the like. In some embodiments, the one or more sample regions 206 can be aligned with the one or more light sources 212 and the one or more optical sensors 214. Contemplated light sources 212 include but are not limited to: ultraviolet (UV) light emitting diodes (LEDs), infrared LEDs, white LEDs, color LEDs (wherein a color is emitted at a specific wavelength or over a wavelength band), tungsten lamps, halogen lamps, arc lamps, laser diodes, and the like. In some embodiments, light sources 212 can be indirectly aligned with a sample region 206 or filtered, such as in dark field imaging or polarized light imaging. Contemplated optical sensors 214 comprise any suitable sensor configured to receive reflected or transmitted light and to convert the light into a quantifiable signal, including but not limited to photodiodes, photodiode arrays, camera sensors, camera sensor arrays, and the like. In various embodiments, chip reader 210 can further comprise one or more transmitters 218 and one or more receivers 220 configured to send and receive instructions and data to controller 222 for storage on one or more non-transitory computer-readable media 226 and execution by the one or more processor 224.

In some embodiments, microfluidic chip reader 210 can be communicably linked with a computer platform 230, wherein computer platform 230 comprises at least one transmitter 232, at least one receiver 234, and at least one controller 236 comprising a processor 238 and non-transitory computer-readable medium 240. Computer platform 230 can perform operations and execute software that replicate or replace operations performable on microfluidic chip reader 210. In certain embodiments, computer platform 230 is compatible with any microfluidic chip reader having light sources, optical sensors, and actuators compatible with the methods of the present invention.

In some embodiments, software executing instructions provided herein may be stored on the one or more non-transitory computer-readable medium 226 and/or the one or more non-transitory computer-readable medium 240, wherein the software performs some or all of the steps of the present invention when executed on a processor.

Aspects of the invention relate to algorithms executed in computer software. Though certain embodiments may be described as written in particular programming languages, or executed on particular operating systems or computing platforms, it is understood that the system and method of the present invention is not limited to any particular computing language, platform, or combination thereof. Software executing the algorithms described herein may be written in any programming language known in the art, compiled or interpreted, including but not limited to C, C++, C #, Objective-C, Java, JavaScript, MATLAB, Python, PHP, Perl, Ruby, or Visual Basic. It is further understood that elements of the present invention may be executed on any acceptable computing platform, including but not limited to a server, a cloud instance, a workstation, a thin client, a mobile device, an embedded microcontroller, a television, or any other suitable computing device known in the art.

Parts of this invention are described as software running on a computing device. Though software described herein may be disclosed as operating on one particular computing device (e.g. a dedicated server or a workstation), it is understood in the art that software is intrinsically portable and that most software running on a dedicated server may also be run, for the purposes of the present invention, on any of a wide range of devices including desktop or mobile devices, laptops, tablets, smartphones, watches, wearable electronics or other wireless digital/cellular phones, televisions, cloud instances, embedded microcontrollers, thin client devices, or any other suitable computing device known in the art.

Similarly, parts of this invention are described as communicating over a variety of wireless or wired computer networks. For the purposes of this invention, the words "network", "networked", and "networking" are understood to encompass wired Ethernet, fiber optic connections, wireless connections including any of the various 802.11 standards, cellular WAN infrastructures such as 3G, 4G/LTE, or 5G networks, Bluetooth®, Bluetooth® Low Energy (BLE) or Zigbee® communication links, or any other method by which one electronic device is capable of communicating with another. In some embodiments, elements of the networked portion of the invention may be implemented over a Virtual Private Network (VPN).

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art may, using the preceding description and the following illustrative examples, utilize the present invention and practice the claimed methods. The following working examples therefore, specifically point out exemplary embodiments of the present invention, and are not to be construed as limiting in any way the remainder of the disclosure.

Example 1: Oral Cancer Cytology Assay with 3-Blister Cartridge (Right, Left, and Center Blisters)

Figure 3:
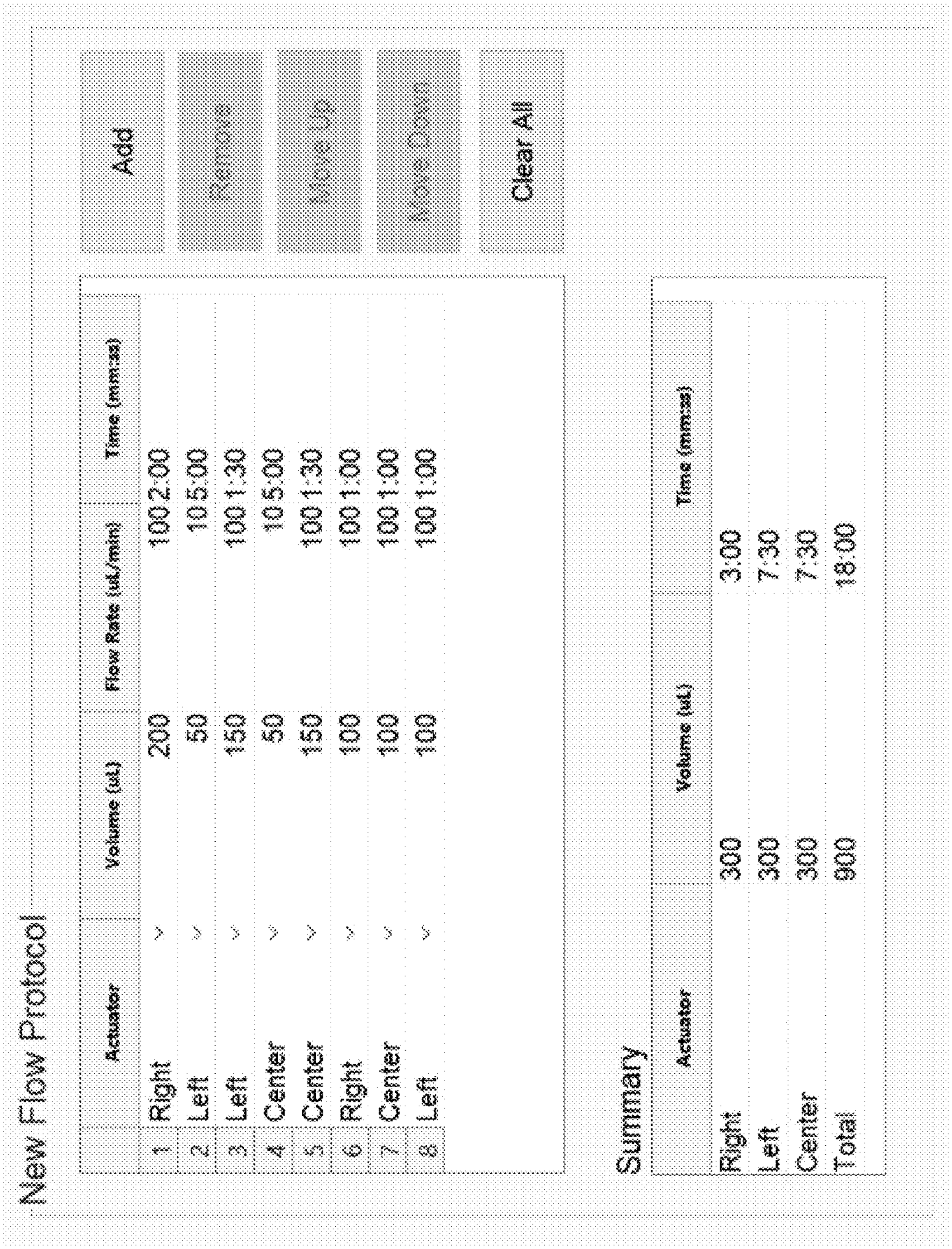
FIG. 3 depicts an image of a user interface implementing an exemplary fluid control method of the present invention in the context of a fluid flow protocol for a 3-blister cartridge. The cell sample is controlled via the right blister, in which the blister's PBS pushes the cytological sample containing oral cells onto a nanoporous cell capture membrane. Optics illuminate the membrane using a UV LED. The fluid is detected via an algorithm that monitors for a shift in image variation (standard deviation) caused by changes in refractive index and image intensity when the membrane is wetted. DAPI+phalloidin (nuclear and cytoplasm stains) are activated by the left blister in which PBS from the blister is released and elutes the reagents from a reagent pad embedded in the cartridge. The optics illuminate the membrane using the UV LED. The fluid containing the reagents is detected via an algorithm which monitors for an increase in the median fluorescence intensity corresponding to the excitation/emission of DAPI, thus signaling the arrival of the left blister contents and eluted dye at the optical FOV. The EGFR antibody (Alexa Fluor 488) for detecting the cell surface marker EGFR is activated by the right blister in which PBS from the blister is released and elutes the reagents from a reagent pad embedded in the cartridge. The optics illuminate the membrane using the cyan/blue LED. The fluid containing the reagents is detected via the same algorithm as for DAPI+phalloidin, except in the instrument's green spectral channel.

An image user interface is shown in FIG. 3 for a 3-blister microfluidic chip cartridge, with a cell sample fluid solution in a right blister, a PBS solution in a left blister upstream from a DAPI+phalloidin (nuclear and cytoplasm stains) reagent elution pad, and a PBS solution in a right blister upstream from an EGFR antibody (Alexa Fluor 488) reagent elution pad. The user interface displays the flow rate used to transfer a respective fluid to a sample membrane, the length of time of fluid transfer, and the total fluid amount transferred.

Sample Delivery Detection

Figure 4:
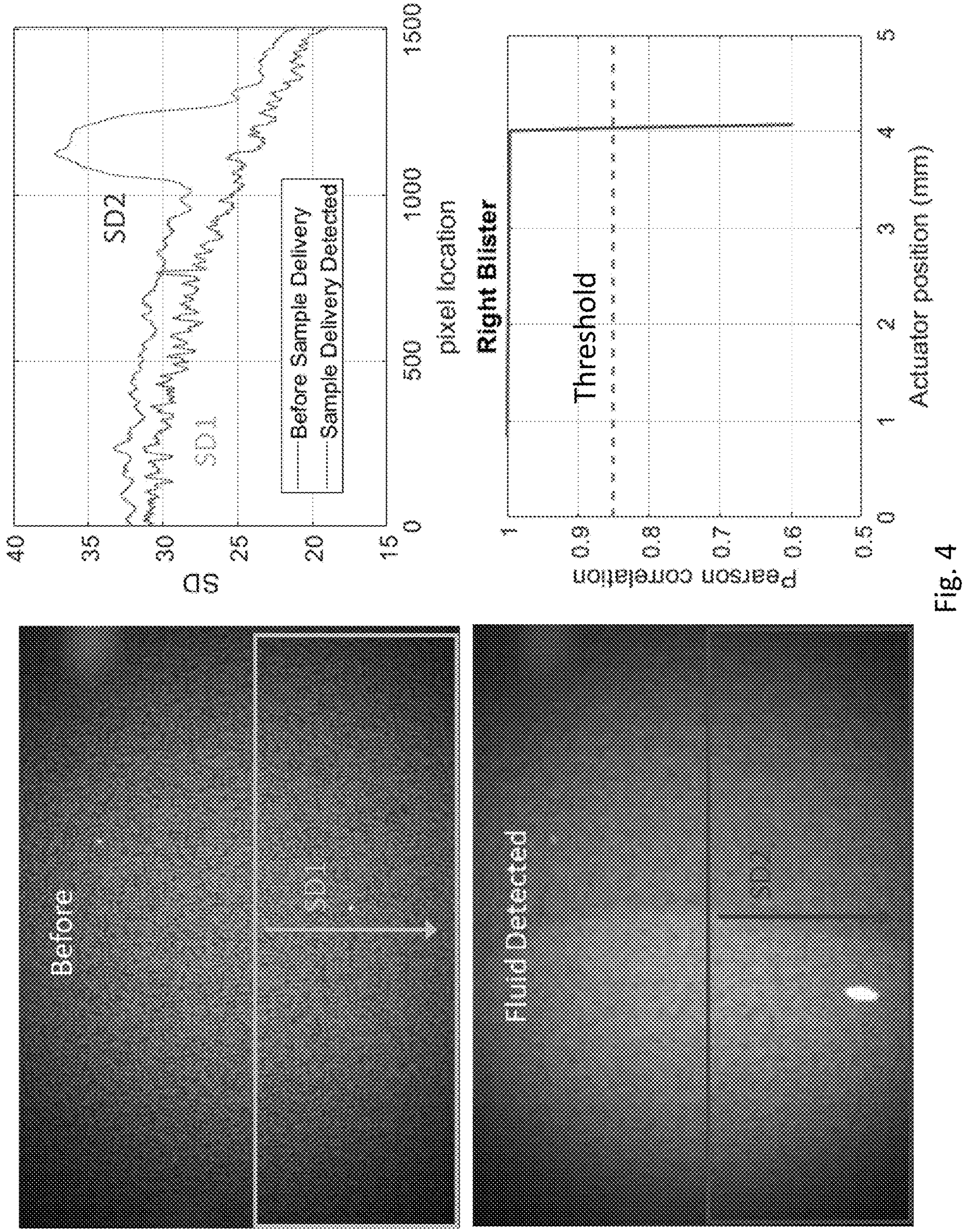
FIG. 4 depicts an exemplary vision system for detecting sample fluid delivery (here, the right blister from FIG. 3). The exemplary sample delivery detection works by first taking an image before actuating a blister. Then, the blister is compressed, and its contents are released into the cartridge. The blister fluid pushes the sample fluid within the microfluidic channels leading to the cell membrane. As the actuator compresses the blister, images of the cell membrane are sampled at regular intervals. An algorithm compares via Pearson correlation the standard deviation (SD) across the membrane, comparing the before SD to the current SD at some actuator position or depth into the blister. When the membrane is wetted, the refractive index and overall image intensity change, thus leading to large changes in the Pearson correlation. When the correlation falls below a threshold value (here, r=0.85), the fluid is considered detected, and the instrument stops actuating the blister and proceeds with the next step of the assay sequence.

A cell sample is controlled via a right blister, in which the blister's phosphate buffered saline (PBS) pushes the cytological sample containing oral cells onto a nano-porous cell capture membrane (FIG. 4). The optics illuminate the membrane using the UV light emitting diode (LED). The fluid is detected via an algorithm that monitors for a shift in the image variation (standard deviation) caused by changes in refractive index and image intensity when the membrane is wetted.

The sample delivery algorithm works by first taking an image before actuating the right blister. Then, the right blister is compressed, and its contents are released into the cartridge. The blister fluid pushes the cell sample fluid within the microfluidic channels leading to the cell membrane. As the actuator compresses the blister, images of the cell membrane are sampled at regular intervals. An algorithm compares via Pearson correlation the standard deviation (SD) across the membrane, comparing the before SD to the current SD at the current actuator position or depth into the blister. When the membrane is wetted, the refractive index and overall image intensity change, thus leading to significant changes in the Pearson correlation. When the correlation falls below a threshold value, the fluid is considered detected, and the instrument stops actuating the blister and proceeds with the next step of the assay sequence.

Reagent Delivery Detection

Figure 5:
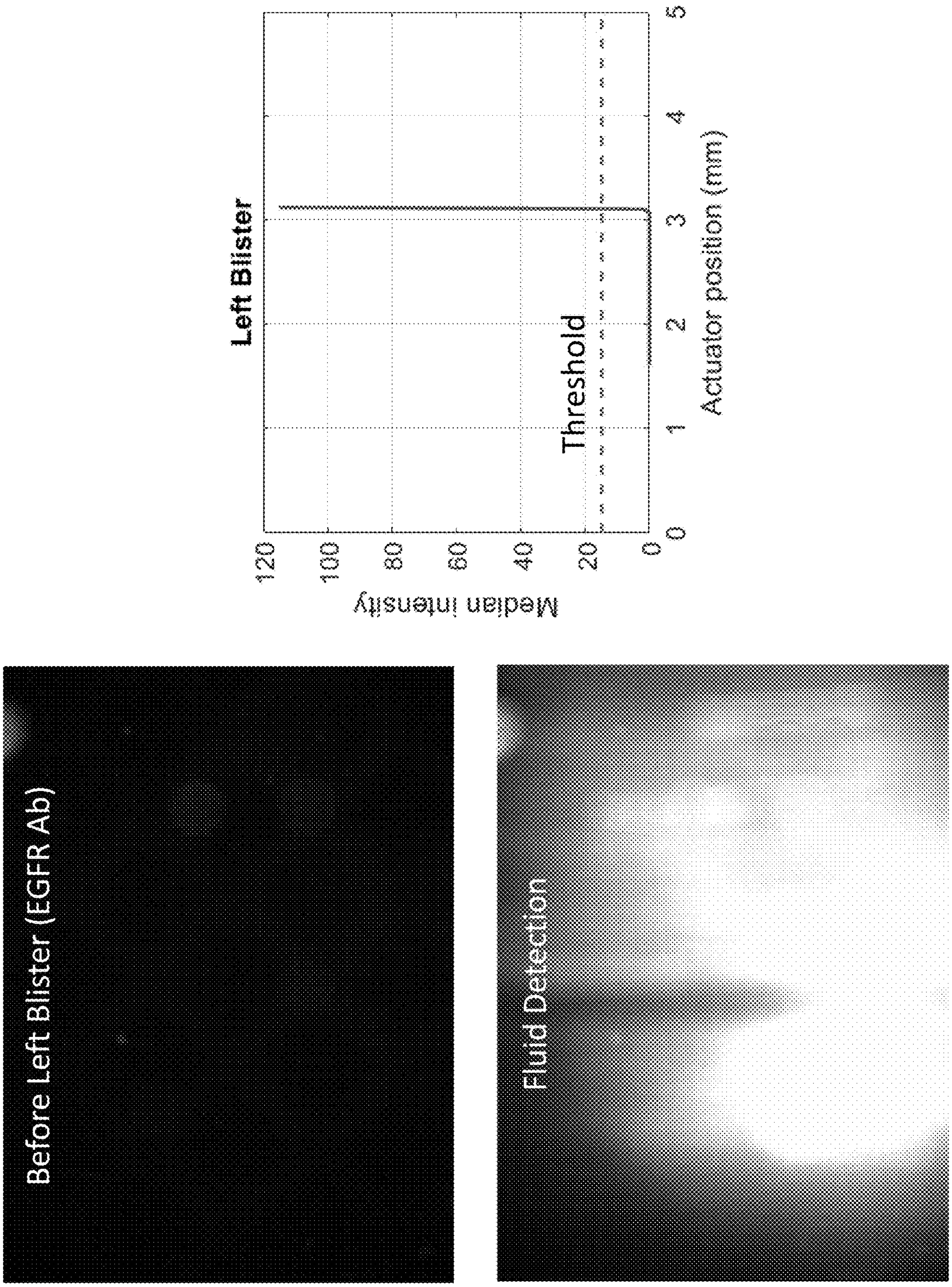
FIG. 5 depicts an exemplary vision system for detecting reagent fluid delivery (here, the left blister from FIG. 3). The exemplary reagent delivery algorithm works by first taking an image before compressing the left or center blisters. Then, the left or center blister is compressed, and its contents are released into the cartridge. The blister fluid elutes and delivers the fluorescent dye reagents from the reagent pads to the cell membrane. As the actuator compresses the blister, images of the cell membrane are sampled at regular intervals. An algorithm compares the median image intensity, comparing the before median value to the current median value at the current actuator position or depth into the blister. When the dye arrives at the membrane, the overall image intensity increases significantly, often saturating the camera's pixels. When the median intensity rises above a threshold value, the fluid is considered detected, and the instrument stops actuating the blister and proceeds with the next step of the assay sequence.

The DAPI+phalloidin (i.e., nuclear and cytoplasm stains) are activated by the left blister in which PBS from the blister is released and elutes the reagents from a reagent pad embedded in the cartridge (FIG. 5). The optics illuminate the membrane using the UV LED. The fluid containing the reagents is detected via an algorithm which monitors for an increase in the median fluorescence intensity corresponding to the excitation/emission of DAPI, thus signaling the arrival of the left blister contents and eluted dye at the optical FOV.

The EGFR antibody (Alexa Fluor 488) for detecting the cell surface marker EGFR is activated by the center blister in which PBS from the blister is released and elutes the reagents from a reagent pad embedded in the cartridge. The optics illuminate the membrane using the cyan/blue LED. The fluid containing the reagents is detected via the same algorithm as for DAPI+phalloidin, except in the green spectral channel.

Figure 6:
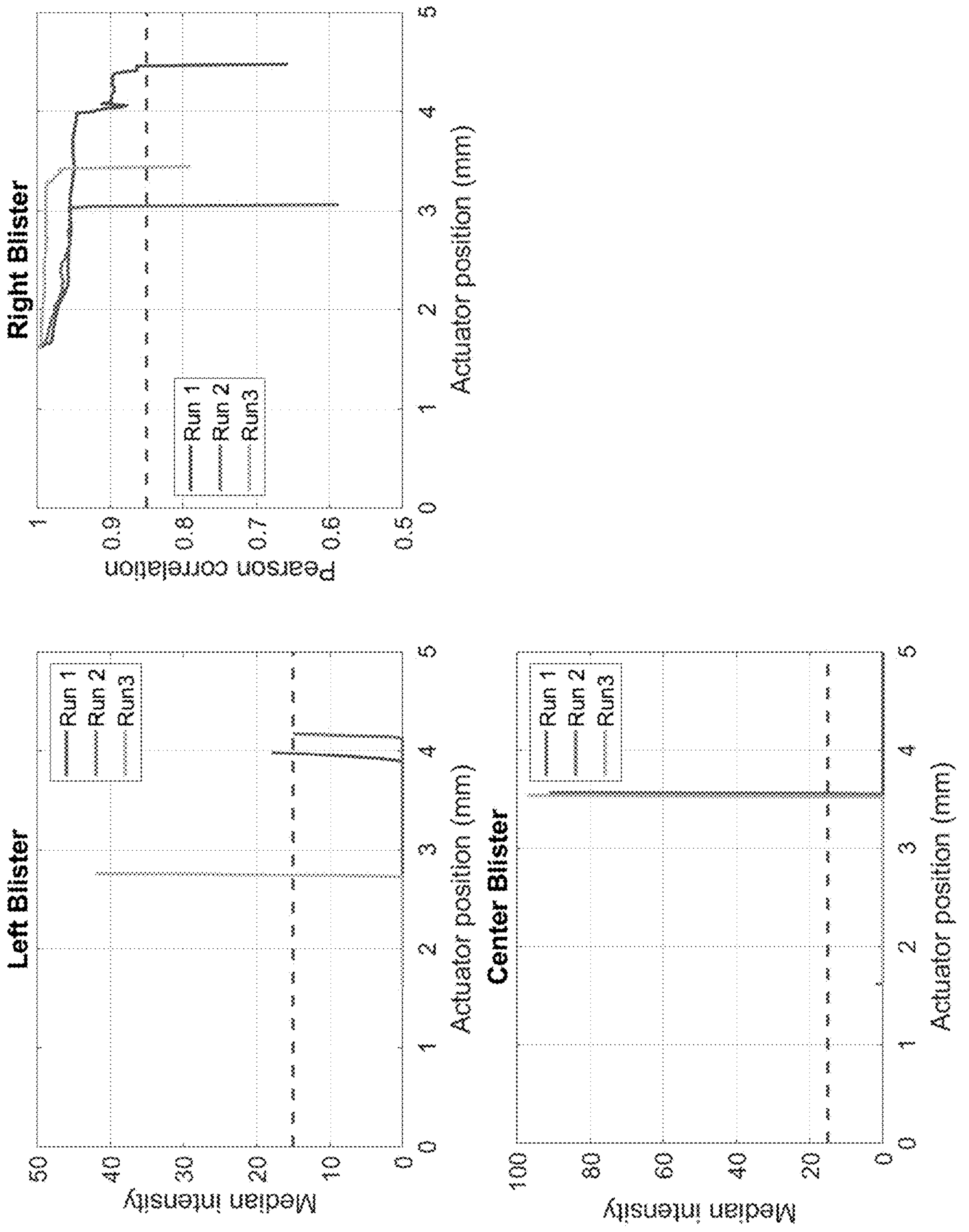
FIG. 6 depicts preliminary results from 3 assay runs for left, center, and right blisters. As actuator position increases into the blister, the vision system collects and analyzes images of the beads/cell membrane using either the cell sample detection (right blister) or reagent detection algorithms (left and center blisters). Note: center blister run 1 cartridge experienced an error that resulted in no fluid being detected.
Figure 7A:
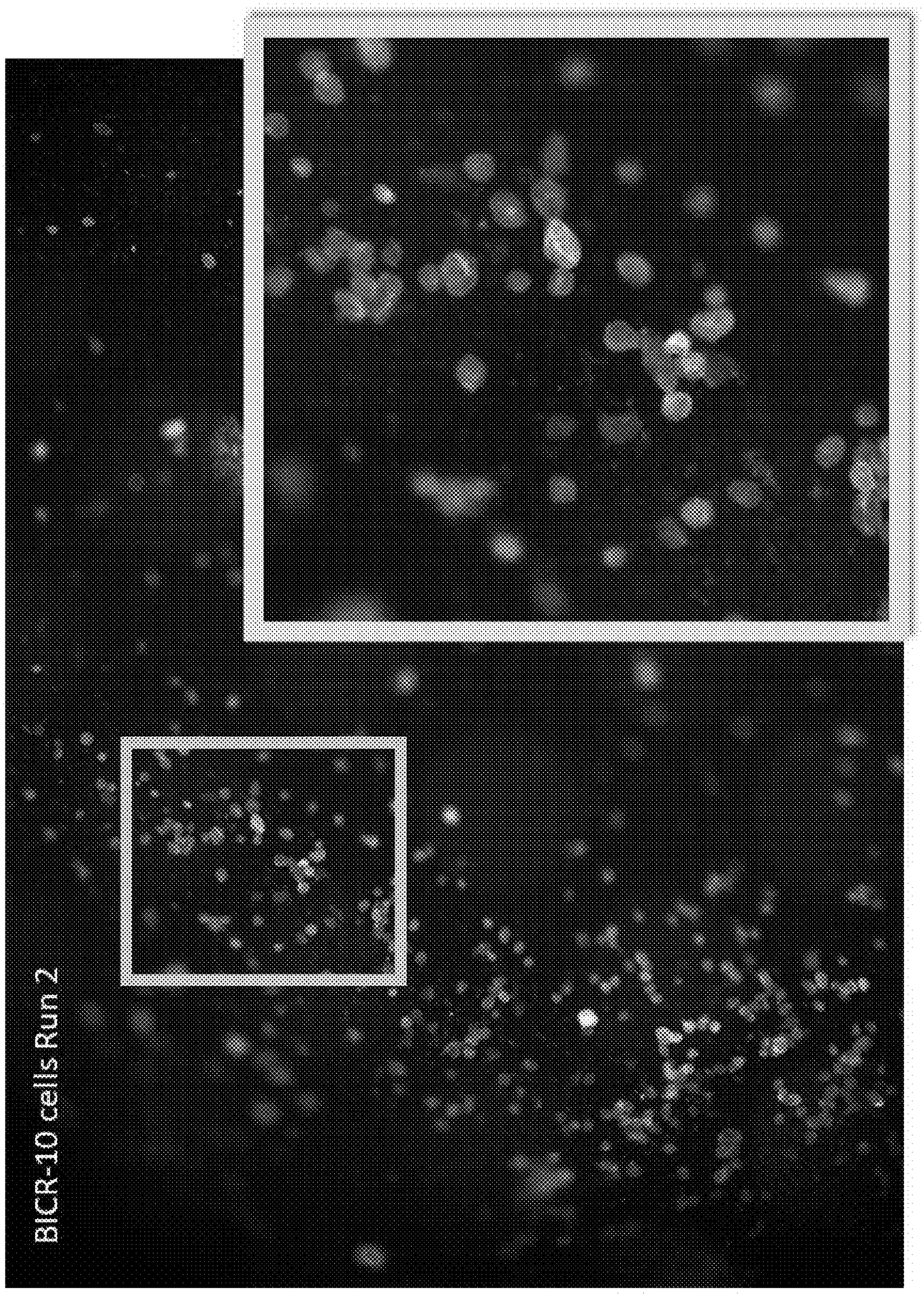
FIG. 7A and FIG. 7B depict preliminary results showing an image of BICR-10 cells (oral cancer cell line) in Run 2 and Run 3 of the experiment depicted in FIG. 6, respectively. Cells are appropriately distributed across the membrane and have adequate staining and image quality, indicating a successful assay.
Figure 7B:
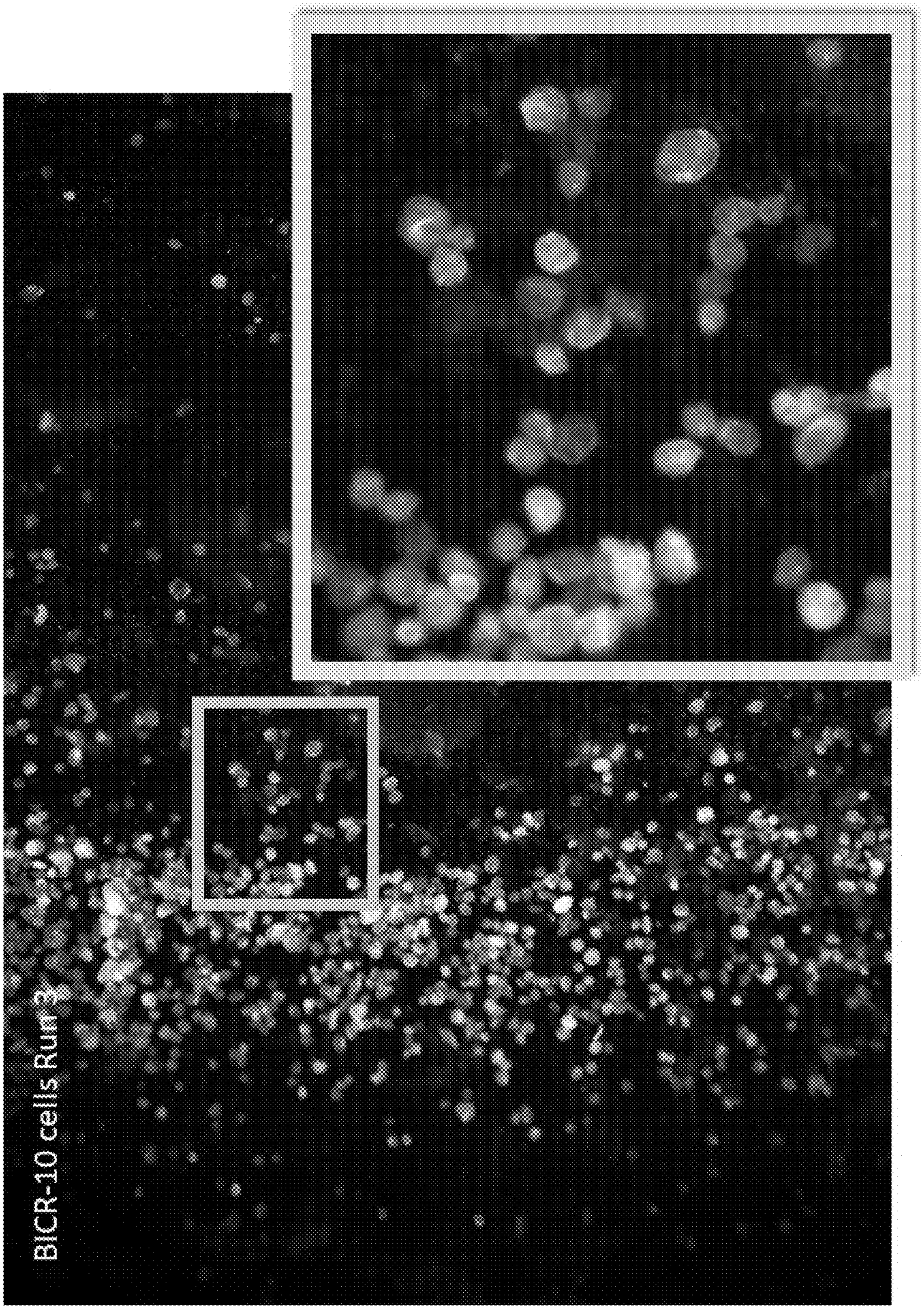
Figure 8:
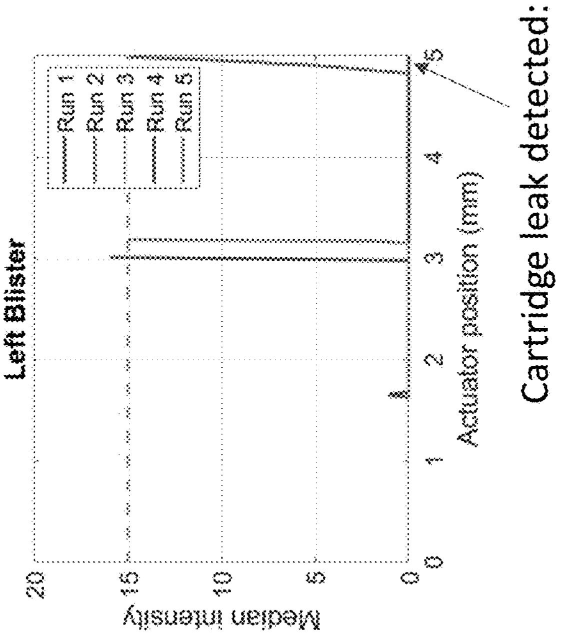
FIG. 8 depicts preliminary results from 5 assay runs for left, center, and right blisters. The results demonstrate that the methods described herein can also be used to detect cartridge leaks. In this scenario, leaks may be detectable if the fluid is not detected within the expected number of steps. In longer assays, like oral cancer, this feature can have significant impact on usability in point of care settings. For example, if a leak is detected by the vision feedback system early in the assay, the run can be rejected and retested, saving up to 30 minutes. Without this feature, a leak would only be detected after the assay is completed and the cartridge is ejected and inspected.
Figure 8:
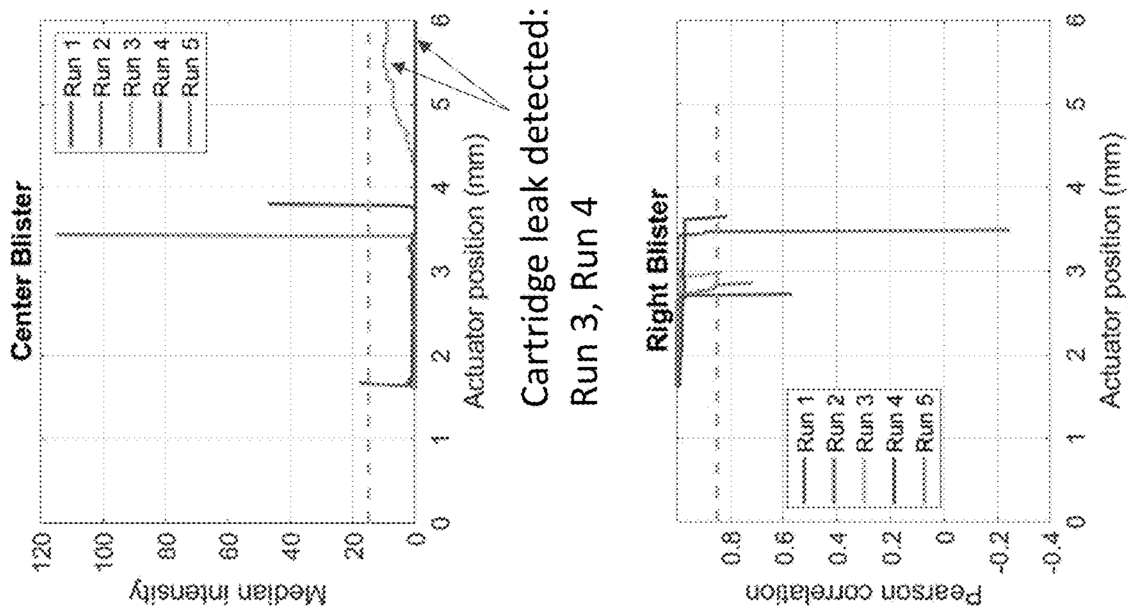
Figure 9A:
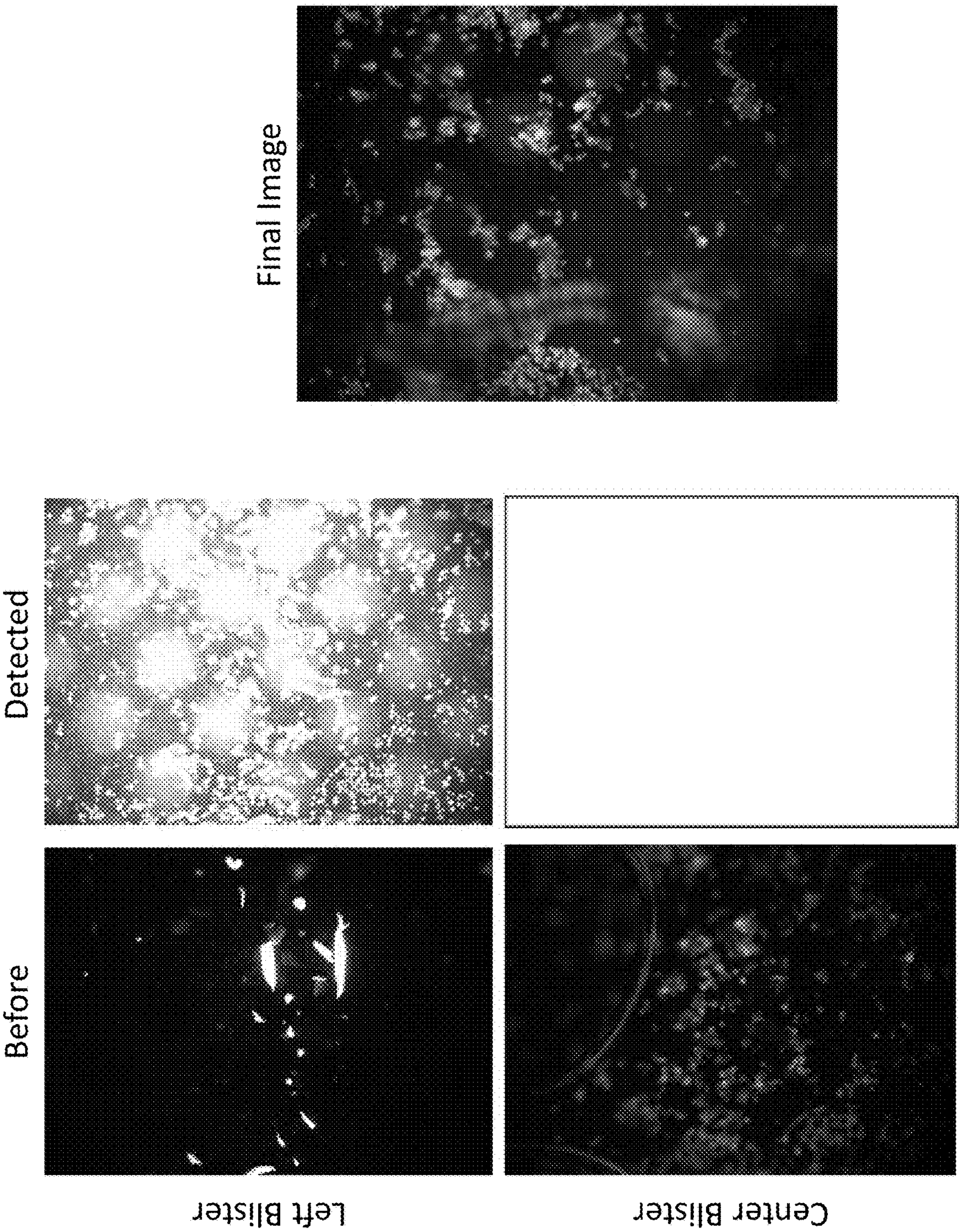
FIG. 9A through FIG. 9C depict raw data of Run 1, Run 2, and Run 5 of the experiment depicted in FIG. 8, respectively. "Before" images are taken prior to compressing the blister and are visually dark since fluorescent detection reagents have not yet been delivered. "Detected" corresponds to the first image which satisfies the detection threshold. Here, fluorescence intensity of the "detected" reagents overwhelms and saturates the camera's pixels, demonstrating robust signal for detecting fluid delivery events. Final image shows the assay results after the excess reagents have been washed away.
Figure 9B:
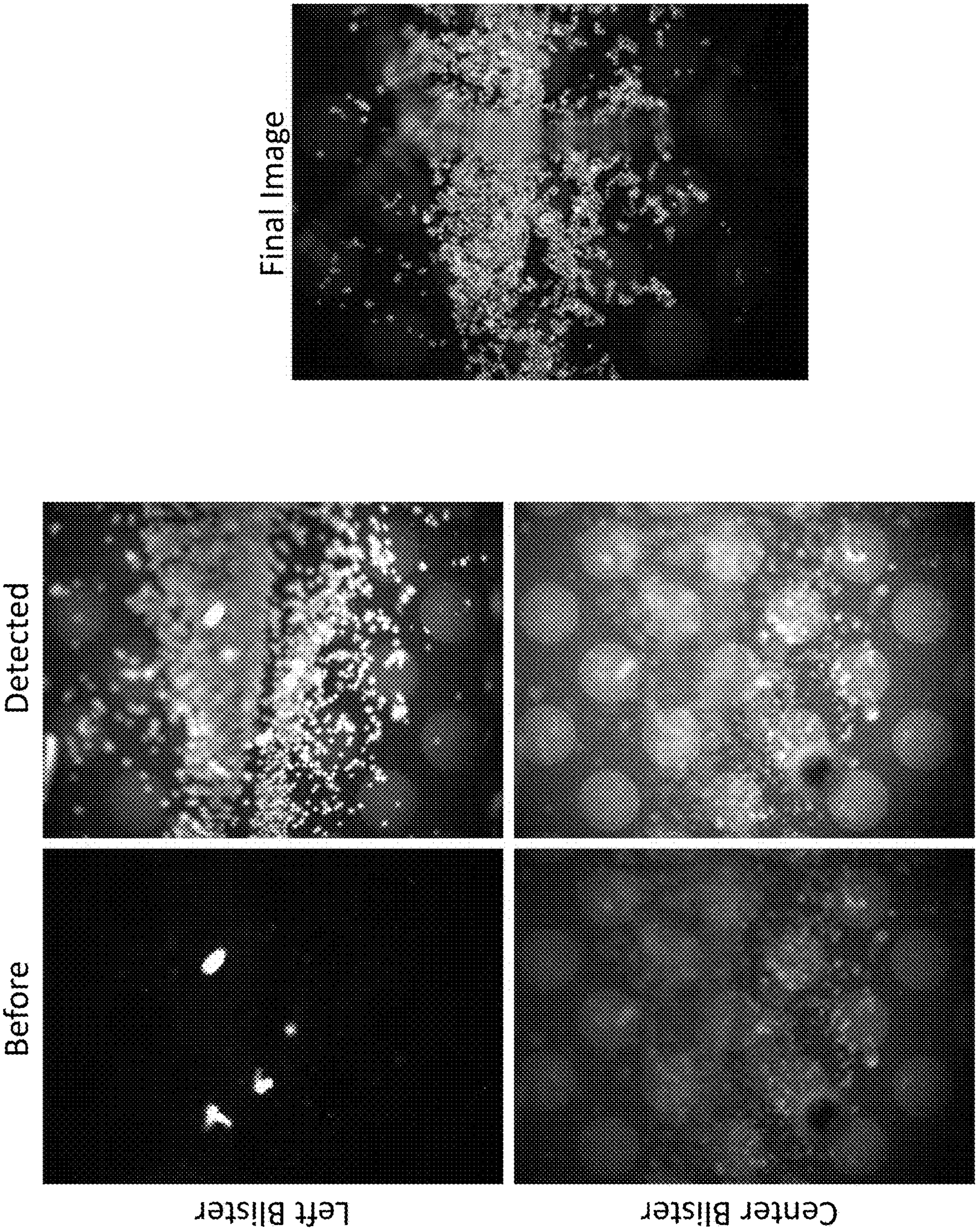
Figure 9C:
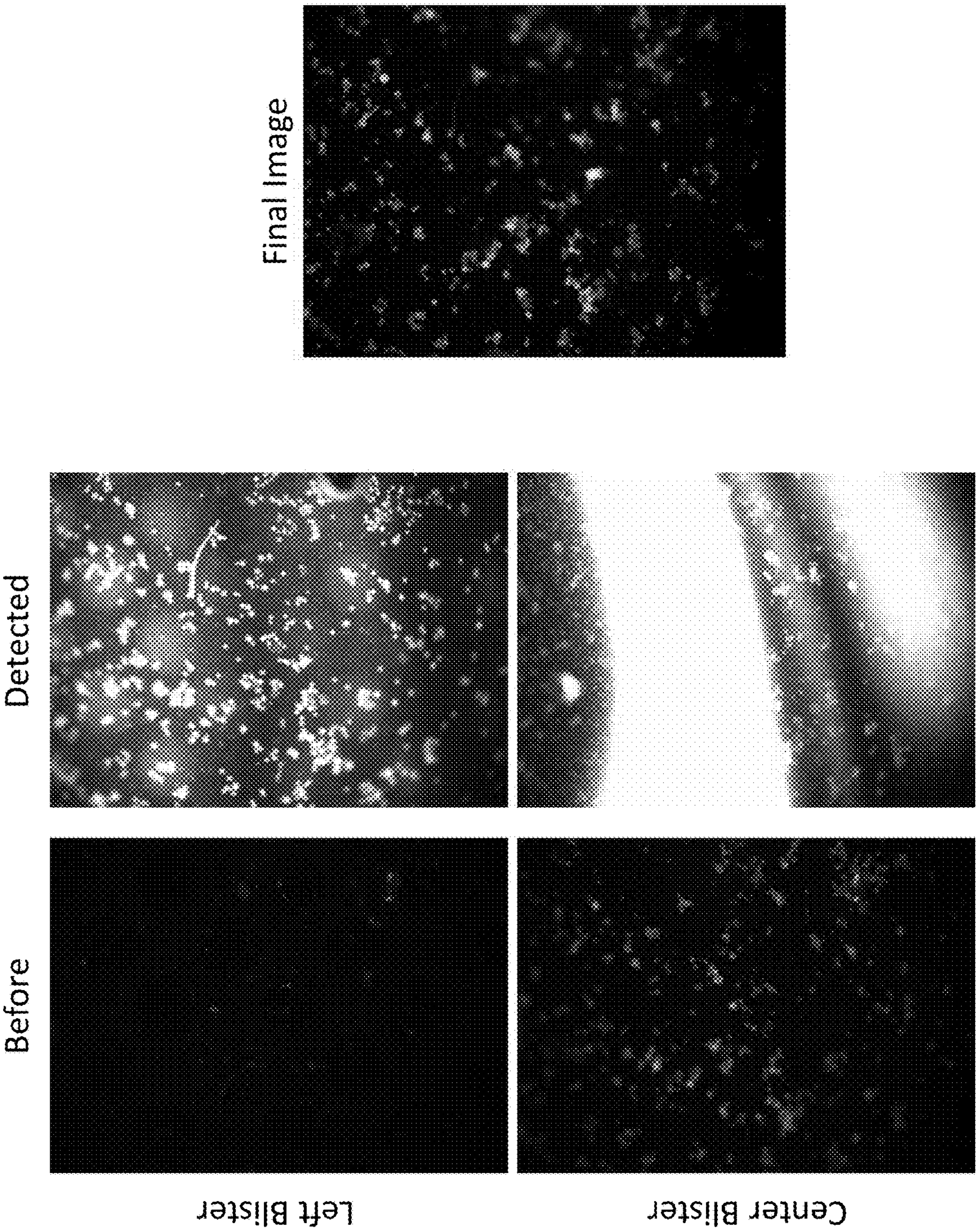
Figure 10A:
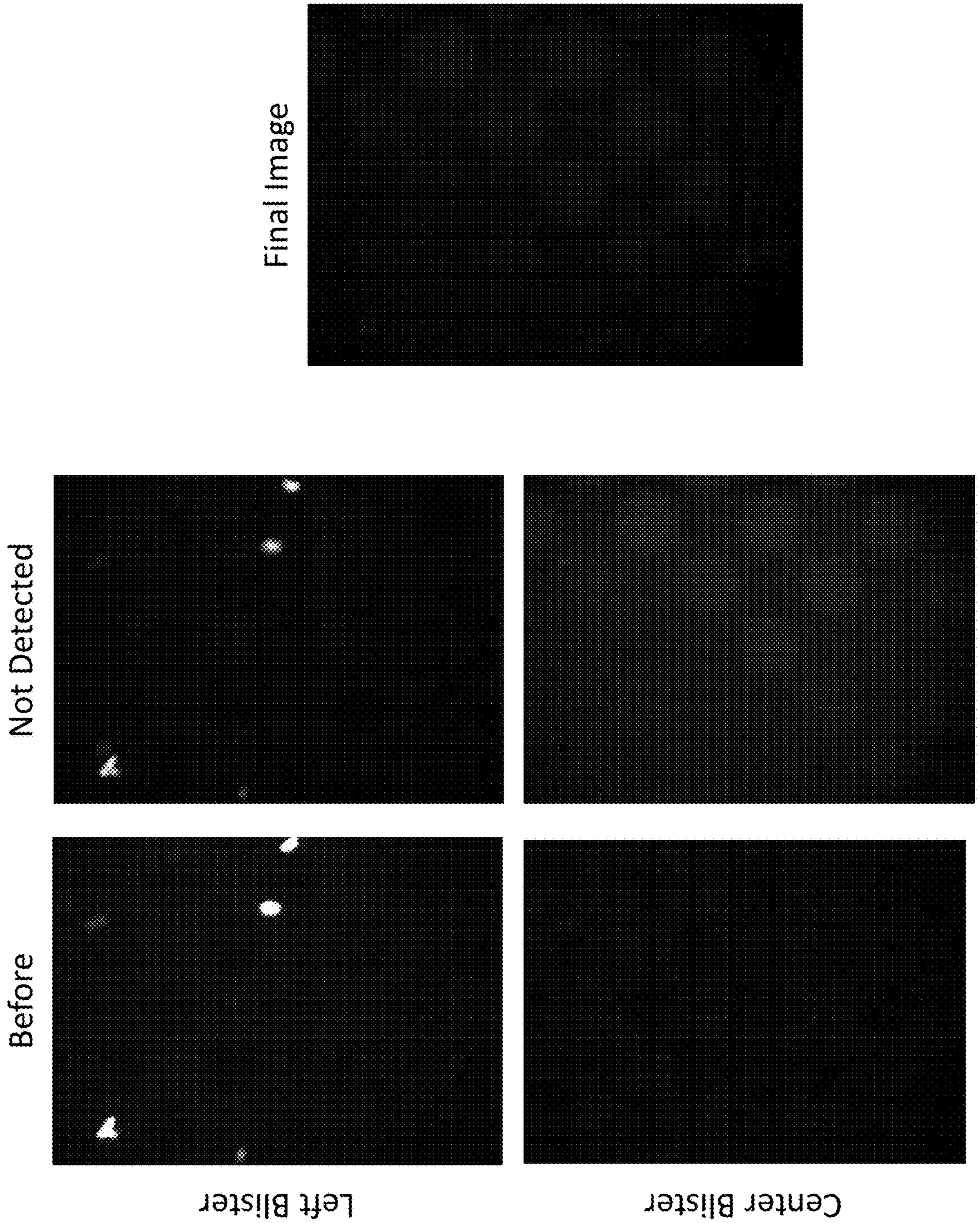
FIG. 10A and FIG. 10B depict raw data of Run 3 and Run 4 of the experiment depicted in FIG. 8, respectively. Dark images for before and after blister compression indicate an assay error, such as a leak.
Figure 10B:
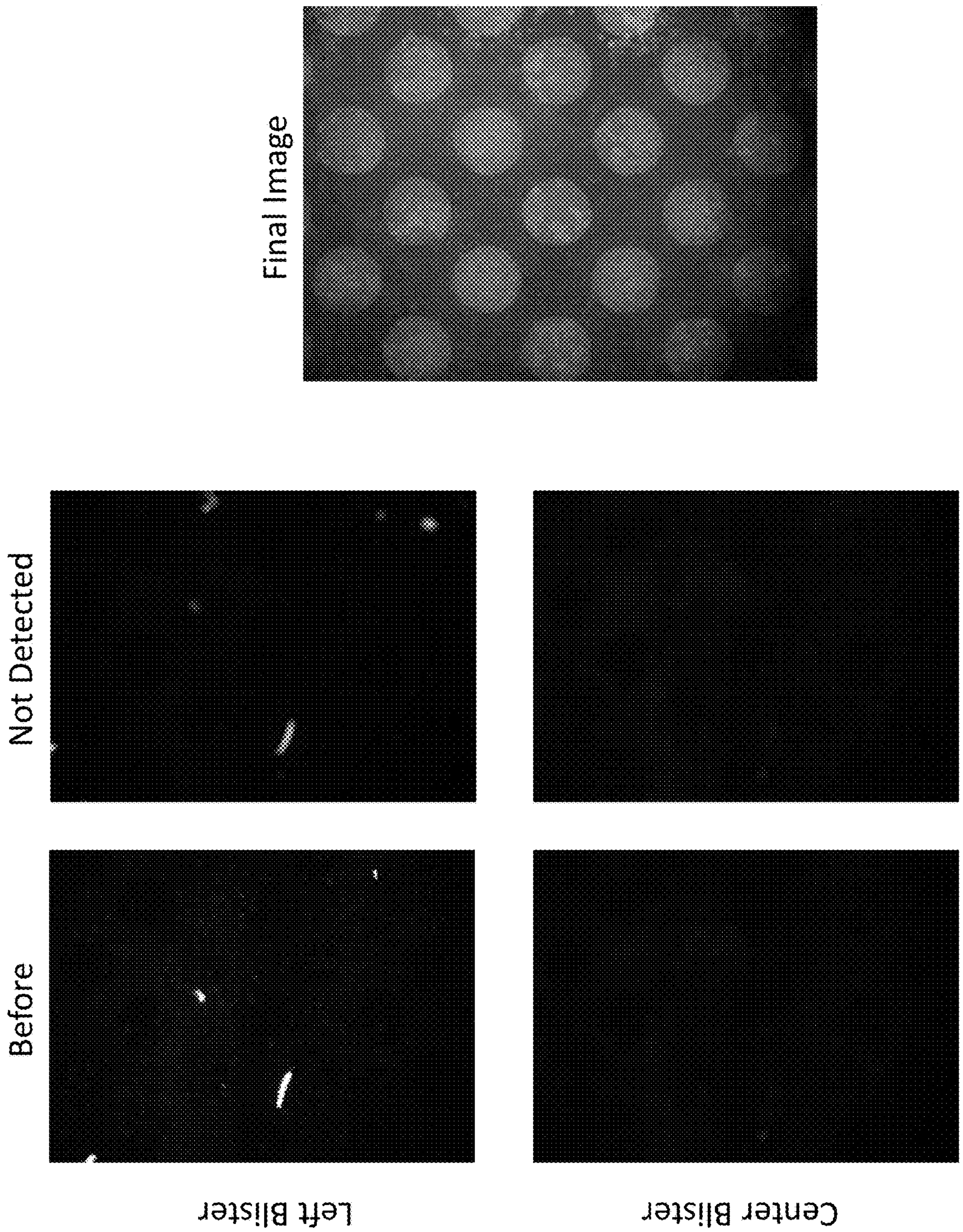

The reagent delivery algorithm works by first taking an image before compressing the left or center blisters. Then, the left or center blister is compressed, and its contents are released into the cartridge. The blister fluid elutes and delivers the fluorescent dye reagents from the reagent pads to the cell membrane. As the actuator compresses the blister, images of the cell membrane are sampled at regular intervals. An algorithm compares the median image intensity, comparing the before median value to the current median value at the current actuator position or depth into the blister. When the dye arrives at the membrane, the overall image intensity increases significantly, often saturating the camera's pixels. When the median intensity rises above a threshold value, the fluid is considered detected, and the instrument stops actuating the blister and proceeds with the next step of the assay sequence (FIG. 6).

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A method comprising the steps of:
capturing and processing an optical signal of a sample region to obtain a baseline measurement of the sample region;
activating an actuator such that a fluid in a fluid reservoir is directed out of the reservoir into the sample region;
continuously capturing and processing a series of optical signals of the sample region while the actuator is activated to obtain a series of measurements of the sample region; and
deactivating the actuator upon obtaining a measurement of the sample region that reaches a threshold measurement; and
wherein the step of deactivating the actuator is performed automatically in a closed loop.

2. The method of claim 1, wherein the optical signal is selected from the group consisting of: a photographic image, optical light, ultraviolet light, infrared light, bioluminescent light, fluorescent light, indirect light, filtered light, and polarized light.

3. The method of claim 1, wherein the actuator is activated at a rate measured by displacement of fluid volume over time.

4. The method of claim 1, wherein failure to reach the threshold measurement indicates a malfunction.

5. The method of claim 1, wherein the actuator is activated at a rate measured by distance traveled by a force applicator over time.

6. The method of claim 1, wherein deactivation of the actuator can be followed by a brief reverse activation of the actuator such that residual flow of the fluid is prevented.

7. A method comprising the steps of:
capturing and processing an optical signal of a sample region to obtain a baseline measurement of the sample region;
activating an actuator such that a fluid in a fluid reservoir is directed out of the reservoir into the sample region;
continuously capturing and processing a series of optical signals of the sample region while the actuator is activated to obtain a series of measurements of the sample region; and
deactivating the actuator upon obtaining a measurement of the sample region that reaches a threshold measurement; and
wherein the actuator is activated at a rate measured by distance traveled by a force applicator over time.

8. The method of claim 7, wherein the optical signal is selected from the group consisting of: a photographic image, optical light, ultraviolet light, infrared light, bioluminescent light, fluorescent light, indirect light, filtered light, and polarized light.

9. The method of claim 7, wherein the actuator is activated at a rate measured by displacement of fluid volume over time.

10. The method of claim 7, wherein deactivation of the actuator can be followed by a brief reverse activation of the actuator such that residual flow of the fluid is prevented.

11. The method of claim 7, wherein failure to reach the threshold measurement indicates a malfunction.

12. A method comprising the steps of:
capturing and processing an optical signal of a sample region to obtain a baseline measurement of the sample region;
activating an actuator such that a fluid in a fluid reservoir is directed out of the reservoir into the sample region;

continuously capturing and processing a series of optical signals of the sample region while the actuator is activated to obtain a series of measurements of the sample region; and deactivating the actuator upon obtaining a measurement of the sample region that reaches a threshold measurement; and wherein deactivation of the actuator can be followed by a brief reverse activation of the actuator such that residual flow of the fluid is prevented.

13. The method of claim 12, wherein the optical signal is selected from the group consisting of: a photographic image, optical light, ultraviolet light, infrared light, bioluminescent light, fluorescent light, indirect light, filtered light, and polarized light.

14. The method of claim 12, wherein the actuator is activated at a rate measured by displacement of fluid volume over time.

15. The method of claim 12, wherein failure to reach the threshold measurement indicates a malfunction.

* * * * *